Sept. 30, 1952 A. A. BERNARD 2,612,583
ARC WELDING ROD AND METHOD OF PRODUCING SAME
Filed July 30, 1946
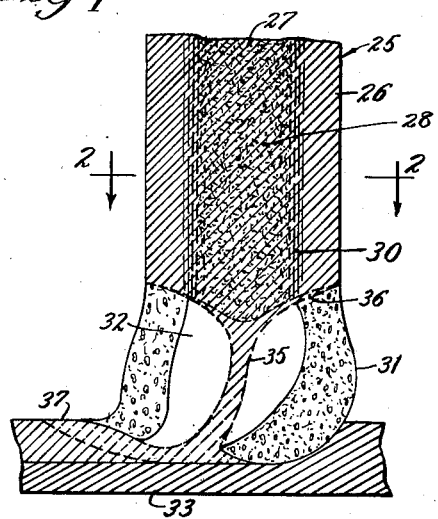
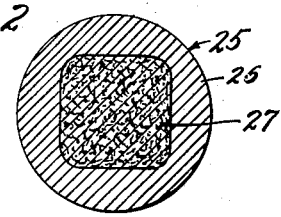
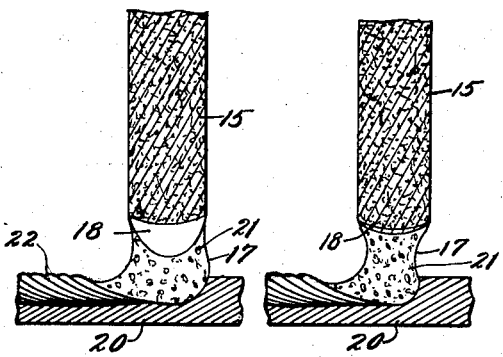
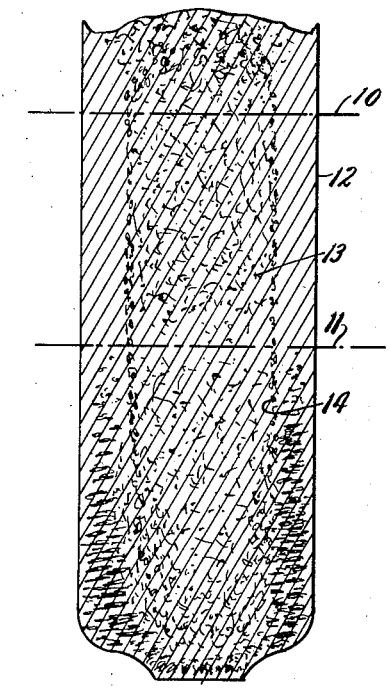
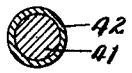
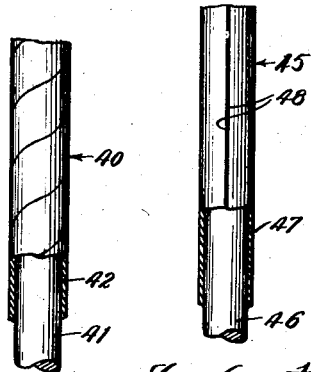
Inventor
Arthur A. Bernard
By:— Mann and Brown
Attys Patented Sept. 30, 1952

2,612,583

UNITED STATES PATENT OFFICE 2,612,583

ARC WELDING ROD AND METHOD OF PRODUCING SAME

Arthur A. Bernard, Chicago, Ill.

Application July 30, 1946, Serial No. 687,199

11 Claims. (Cl. 219—8)

My invention relates to welding, with special reference to arc welding methods in which the metal of an electrode is transferred through the welding arc to the base metal, and is directed not only to a welding method but also to a welding electrode as an article of manufacture and to methods of producing such electrode. While the invention has special utility in electric welding, and is being initially applied to the problems of electric welding, it will be apparent to those skilled in the art that the invention is also applicable to oxy-acetylene welding.

The general object of my invention is to achieve certain substantial advantages over welding methods heretofore prevalent. It is my purpose to increase the rate at which the electrode metal is melted and transferred to the base metal, and to provide what may be termed an electrically stable arc in which the metal is transferred through the arc in finely divided form at substantially a constant rate. In this regard a feature of my invention is that I avoid the periodic formation of droplets or globules of molten metal on the end of the electrode.

By achieving a stable arc with consequent little variation in the circuit resistance I attain the further and very important object of safeguarding the operator against shock. When the circuit resistance at the arc varies widely the open circuit voltage of the welding circuit must be correspondingly high to insure maintenance of the arc. If, for example, in conventional arc welding it is necessary to provide 30 volts across the arc, the open circuit voltage in the absence of an arc must be on the order of 80 volts—a dangerously high voltage for the amperage used. In the prevailing methods of inert atmosphere arc welding, the voltage across the arc is much higher than in ordinary welding, with corresponding increase in the open circuit voltage. My invention makes it possible to reduce the open circuit voltage to a safe value, both in ordinary welding and in welding in an inert atmosphere.

One difficulty in conventional arc welding is the troublesome tendency of the magnetic field at the arc to produce turbulence in the molten metal and to splash the weld metal outside the welding zone. An object of my invention is to reduce this tendency and to remove this particular limitation on the amount of current used. In the preferred practice of my invention the tendency to splatter is reduced to such an extent that the deposited weld metal is relatively smooth, as distinguished from the pronounced rippled deposit characteristic of conventional welding practice.

While it is not my intention to eliminate the use of fluxes in arc welding, and it is contemplated that in most practices of the invention such fluxes will be used for shielding action, nevertheless a feature and object of my invention is the provision of a welding electrode that inherently favors the formation of a desirable arc to such a degree that supplemental ions from flux become unnecessary.

One of the more important objects of my invention relates to the problem of welding stainless steel. Prior to my developments for meeting this problem it has not been commercially feasible to transfer metal by arc action from a stainless steel electrode to stainless base metal in an oxygen-free medium such as inert gas. In helium arc welding, for example, a tungsten electrode or a carbon electrode is employed to sustain the arc, and stainless steel is fed into the arc to be melted thereby for forming the weld. The stainless steel is not a part of the arc stream. For the first time within my knowledge it is now possible to employ a stainless steel rod as an electrode for sustaining an arc enveloped in helium or argon with satisfactory transfer of the metal of the electrode through the arc to the base metal.

Broadly, these objects are attained by so processing or so fabricating the electrode metal as to cause the arc or the ion stream of the arc to assume the general configuration of a tube and to cause the metal to be transferred from the electrode through the tube in finely divided state at a uniform rate. It has been established that the necessary factors are inherent in the electrode and are determined primarily by the electrode structure rather than the analysis of the electrode metal. The primacy of the structure is proved by the fact that of two electrodes of identical analysis one processed in accord with my invention will be operative, whereas the other electrode processed in accord with conventional practice will fail to serve the purpose. Evidently there is an essential structural difference of some kind between the peripheral portion of the new electrode and the core portion, and, as will be discussed later, I have reason to believe that the difference is a matter of density and/or grain and/or crystal lattice structure.

Various procedures may be employed for obtaining a welding electrode of the desired character. In the preferred practice of my invention, however, the required structure is achieved by cold working suitable electrode material in a suitable manner and to a suitable degree. The cold working is carried to a further point than is necessary or usual for the fabrication of conventional welding electrode, but is carried out by stages of reduction that are less drastic than usual. Some difference in structure between the electrode periphery and the electrode core usually exists prior to such cold working, for example, a structural difference by reason of porosity of the core metal and by reason of segregates in the core region, but such initial structural differentiation taken alone is inadequate for my purpose. The cold working of the metal by stages produces a certain cumulative effect or conditioning of the metal that is requisite for the desired arc, and care is taken to keep the metal from rising in temperature to a point that will undo the cumulative effect. The avoidance of such a detrimental or nullifying degree of heating is a distinction over the conventional methods of manufacturing welding electrode.

Other objects and advantages of my invention will be apparent from the following detailed description taken with the accompanying drawings.

In the drawings, which are to be regarded as merely illustrative:

Fig. 1 is a diagrammatic view in longitudinal section of a preferred form of the new electrode, illustrating the new welding action;

Fig. 2 is a transverse section taken on the line 2—2 of Fig. 1;

Fig. 3 is a longitudinal section through an ingot of the type preferred in some practices of my invention;

Fig. 4 is a diagrammatic view in longitudinal section similar to Fig. 2, showing how a globule of molten metal forms on the end of a conventional electrode in the usual arc welding operation;

Fig. 5 is a view similar to Fig. 4, taken after the globule has passed onto the base metal;

Fig. 6 is a side elevation, partly broken away, of a second embodiment of my invention;

Fig. 7 is a similar view of a third embodiment; and

Fig. 8 is a cross-section of a fourth embodiment.

*Preferred process for producing the new electrode*

Briefly described, the preferred method of producing the new electrode in any metal, ferrous or non-ferrous, consists simply of selecting suitable stock material and cold working the material to a greater extent than heretofore deemed necessary, the cold working being carried out in easy stages and with care to avoid raising the temperature of the metal to a degree detrimental to my purpose.

For low carbon steel electrodes I use stock material of rimmed steel in which the cross-sectional area of the "rim" portion of the stock is from thirty-five to sixty per cent of the total cross-sectional area of the stock. The preferred practice of my invention in this respect may be understood by referring to Fig. 3, showing in cross-section a typical rim ingot of 0.08% carbon steel.

The portion of the ingot selected for my purpose lies between the transverse lines 10 and 11, and may be generally described as constituting the upper half of the ingot. In this upper half of the ingot the rim portion 12 is formed of compact continuous metal, whereas the core portion 13 is more porous. The core portion is not only porous but also includes the segregates that are driven inwardly as the ingot cools in the mold. At the juncture of these two portions is a thin annular zone 14 of exceptional porous metal. In the lower discarded half of the ingot, on the other hand, the rim portion 12 is highly porous and the core portion may be even less porous than the rim portion.

Ingots should be discarded in which the cross-sectional area of the rim portion 12 is substantially less than 35% or substantially more than 60% of the total cross-sectional area of the ingot. Preferably the rimmed portion constitutes approximately 50% of the total cross-sectional area. The select portion of the ingot lying between lines 10 and 11 may be actually cut out of the ingot prior to rolling of the ingot, or, after any number of passes through the forming rolls, the corresponding portion of the elongated material may be separated for further processing in the production of the new electrode.

In the manufacture of high carbon steel electrodes and alloy steel electrodes, such as electrodes required for welding stainless steel, the ingots are not usually rimmed, at least to the extent indicated in Fig. 3, but, nevertheless, usually there is greater porosity in the core region than in the peripheral region of the ingot and the segregates usually are concentrated in the core region, and such differentiation in structure is believed to be useful for my purpose.

Having selected suitable stock material for the process, with emphasis on rimmed steel for low carbon steel electrodes, the desired electrodes are produced by cold working of the stock material to such extent that the stock material is reduced in cross-sectional area to not substantially more than 25% of the initial or starting cross-sectional area prior to the cold working. In other words, to produce an electrode of a given diameter the stock selected may be hot rolled rod of at least twice the desired diameter. In reducing the stock by cold working, either by rolls or drawing dies, it is essential that the metal stay below what I term a detrimental or nullifying temperature throughout the process. If, for example, a welding electrode that has been cold worked in the required manner to be made suitable for my purpose is annealed prior to use, it will be rendered inoperative.

It is also desirable in the practice of my invention that the 75% reduction in cross-sectional area by cold working be carried out gradually, i. e., in a number of stages. Drastic cold working will not produce a satisfactory electrode. For low carbon steels the reduction in cross-sectional area by each stage of cold working should not exceed 20% of the cross-sectional area at the beginning of the stage. For stainless steel electrodes the reduction in cross-sectional area of each stage should not exceed 15%, usually 10% maximum will be preferred. In general it may be stated that the new electrode is produced by reducing stock material in cross-section on the order of 75% or more, and by doing so in five or more stages.

*Distinctions over prior manufacturing practice*

With reference to the production of low carbon steel electrodes a manufacturer commonly selects rimmed steel stock to pass through drawing dies for reduction to the desired electrode size, but neither the selection of the stock nor the cold working of the stock is in accord with my requirements set forth above. In a large number of conventional low carbon electrodes taken at random from numerous commercial sources the cross-sectional area of the rim portion is found to vary from 0% to 80% of the total cross-sectional area. In all instances, moreover, it has been found that the conventional low carbon electrode that has a rim portion lying in the thirty-five to sixty per cent range has not been cold worked to the extent and in the graduated manner required for the successful practice of my invention. This last fact is to be expected because electrode manufacturers regard cold working to the extent of reducing the cross-sectional area on the order of 75% as excessive and as uneconomical processing.

Many welding electrode manufacturers purchase hot rolled rod for processing, and the prevailing practice is to produce all diameters of electrode wire from 1/4" diameter down to 1/8" diameter from what is known in the trade as a No. 5 hot rolled rod of approximately .250" diameter. To produce a 1/4" diameter electrode wire the .260" diameter hot rolled rod is drawn through a .250" diameter draw die for a total reduction in cross-sectional area of the annealed rod of less than 1%. A 7/32" diameter electrode wire is generally reduced to size by a single pass reduction of the No. 5 hot rolled rod, the total reduction in cross-sectional area being 29%. In this latter instance the reduction by cold working is not carried far enough for my purpose, and, moreover, the single step is too drastic. A 3/16" diameter electrode wire is drawn to size by two, and sometimes three, passes through drawing dies, the total reduction in area being 48%. The 5/32" diameter electrode wire is drawn to size by three or four passes, and the total reduction in area from the original No. 5 hot rolled rod is 64%.

To produce 1/8" diameter welding electrode the No. 5 hot rolled rod is cold drawn down to 5/32" diameter and then is annealed before final reduction in drawing dies to 1/8" diameter. Since the annealing of the 5/32" diameter wire nullifies the benefit of the prior cold working, the effective reduction by cold working would begin at the 5/32" diameter and would amount to only 36% reduction in cross-sectional area.

It is apparent that even if such manufacturers selected No. 5 hot rolled rod from high quality rimmed steel of low carbon content in which the rimmed steel constituted 50% of the total steel, the resultant electrodes would not come within the practice of my invention because of insufficient cold working, and in some instances also because of too drastic steps in reducing the wire in cross-sectional area.

In some larger mills that are equipped to process ingots on down through billets to hot rolled rod of any diameter, the practice is to produce electrode wire in two drawing operations with about 20% reduction in cross-sectional area in each draw, hot rolled rod of appropriate size being used. In this practice the total reduction in cross-sectional area is about 36%.

In contrast to these prevailing practices a manufacturer with my teachings in mind would produce a 1/8" diameter electrode wire, for example, by passing a No. 5 hot rolled rod through successive drawing dies without at any time permitting the metal to reach a nullifying temperature.

In conventional practice hot rolled rod having a relatively thin rim is used for drawing large diameter wire because only light reducing in diameter is contemplated—rods with thicker rims being used for the small diameter wires. Under this practice larger diameter electrodes seldom have sufficiently thick rim portions for my purpose, and the smaller diameter electrodes, on the other hand, usually have rim portions that are too thick.

In the production of electrode for welding stainless steel under my concept, the degree of cold working required is such that the normally non-magnetic stainless steel electrode wire becomes magnetic and one test for a satisfactory product is to ascertain whether or not a magnet will attract the electrode. In this regard my invention is again contrary to conventional practice. The prevailing thought is that a stainless steel which is alloyed to be austenite in its annealed state loses much of its stainless character when cold worked to such degree as to be ferromagnetic. In extensive tests of such electrodes from numerous sources, I have found no magnetically responsive electrode. This prevailing thought is correct with respect to finished products, and my finished weld metal is not ferromagnetic. My teaching is that the austenitic electrode may be cold worked to whatever degree is desirable for my purpose, since the effect of the cold working with respect to magnetic responsiveness is nullified by the high temperatures reached in welding.

*Improved welding operation with the new electrode*

The manner in which the new electrode functions in actual welding operation may best be understood by referring first to a conventional welding operation as represented by Figs. 4 and 5.

The conventional electrode 15 selected for illustration is made from unrimmed steel, and therefore is substantially uniform in cross-section with respect to density, porosity, and the concentration of segregates. There is no substantial difference between the conductivity of the peripheral or circumferential portion of the electrode and the axial or core portion. The ion field or heat pattern of the arc proper, indicated in Figs. 3 and 4 by reference numeral 17, is continuous and substantially uniform in cross-section. The length of the arc 17 varies widely because of the cyclic formation of droplets or globules 18 of molten metal on the end of the electrode. The greater part of the transfer of metal from the electrode 15 to the base metal 20 is by the formation and dropping away of the successive liquid globules 18. The globules 18 that characterize conventional welding practice vary in size, depending upon the analysis of the metal. Often in using low carbon steel electrodes, and invariably in using austenite stainless steel electrodes, the globules become substantially larger in diameter than the electrode itself. Although most of the metal is transferred in the form of such globules, some metal is transferred in the form of minute particles 21 in the arc stream, which particles may be vapor particles or may be ions, or both.

When a globule 18 extends downward over a substantial portion of the distance between the solid tip of the electrode 15 and the base metal 20, as shown in Fig. 4, the resulting narrowing of the arc gap correspondingly lessens the resistance to the flow of current and the voltage of the welding circuit is correspondingly reduced. When such a globule as is shown in Fig. 4 detaches itself from the electrode to pass onto the base metal, the length of the arc gap is suddenly greatly increased, as indicated in Fig. 5, with a corresponding increase in the circuit voltage. A new globule 18 then begins to form. Thus, in the conventional arc, the welding circuit voltage constantly rises and falls in accord with the cyclic formation of the liquid globules of the metal at the end of the electrode. The welding voltage may drop as low, for example, as two to three volts when a globule substantially spans the arc gap, and, on the other hand, may rise to fifty volts when the globule is detached.

It will be noted in Figs. 4 and 5 that the weld metal is deposited with pronounced surface ripples, as indicated at 22. Such ripples are caused in part by the inherent stability of the arc with reference to cyclic formation and release of the liquid globules 18, and in part by a certain turbulence of the melted metal arising from the magnetic field engendered by the arc 17.

The rate at which the electrode metal is melted in the operation represented by Figs. 4 and 5 is relatively slow for two reasons. In the first place, the amount of current that can be used is limited because the tendency of the molten metal to splatter increases with the magnitude of the current so that the tendency to splatter necessitates operating with lower current than would otherwise be possible. In the second place, the melting of the electrode is retarded by the presence of a liquid globule 18, especially when the globule grows to a relatively large size, as shown in Fig. 4. The heat of the arc may reach the solid metal of the electrode only by paths of conduction through the globule.

Figs. 4 and 5 do not illustrate the conventional welding of stainless steel because, as heretofore stated, it has not been possible heretofore to weld stainless steel in the same manner as low carbon steel.

The new low carbon electrode, generally designated 25 in Fig. 1, has a peripheral portion or rim 26 surrounding a core portion 27, the rim portion constituting between thirty-five and sixty per cent of the cross-sectional area of the electrode. The electrode has been reduced by cold working to the degree and in the manner heretofore described. The segregates represented by dots 28 are concentrated in the core portion 27. The core portion 27 is relatively porous and may be surrounded by an annular zone 30 of collapsed porosity, corresponding to the previously mentioned annular zone 14 found in the original ingot.

The ion field or heat pattern of the arc proper 31 is tubular in configuration as distinguished from continuous in cross-section. Within the space 32 enclosed by the arc 31 the metal is transferred from the electrode 25 to the base metal 33 at a substantially constant rate, the metal being in finely divided state and forming a central stream 35. At the tip of the electrode the core portion 27 is melted in a lagging manner so that the core portion forms a point, as shown. A relatively thin layer 36 of molten metal, of substantially constant thickness, exists on the tip of the electrode and continually feeds the central stream 35.

Certain distinctions of the welding action represented in Fig. 1 over the welding action represented in Figs. 4 and 5 are important.

In the first place, the current path in Fig. 1, represented by the arc proper, is tubular and therefore the inner space 32 is not subjected to a disturbing magnetic field; consequently the tendency for the weld metal to splatter is greatly reduced. Thus the deposited weld metal has a relatively smooth surface, as indicated at 37. Since the splatter tendency is reduced for a given magnitude of current, more welding current than heretofore feasible may be used in normal welding with the new electrode 25.

In the second place, for a given welding current the arc 31 produced by the new electrode 25 reaches a higher temperature than the arc 17 produced by the conventional electrode 15. In Fig. 1 the heat pattern of the arc, instead of being continuous in cross-section, is annular or ring-shaped in cross-section, the heating effect of the arc being concentrated in the outer regions. Such exceedingly intense heat results in efficient melting of the electrode.

A third distinction is that only a light layer of the molten metal 36 separates the arc 31 from the solid metal of the electrode, the layer being too thin to retard to any substantial extent the transfer of heat from the arc 31 to the solid electrode. The metal is melted relatively rapidly by a given arc.

A fourth distinction is the important fact that the length of the arc in Fig. 1 is substantially constant, in contrast with the cyclic variation in the length of the arc 17 in Figs. 4 and 5. As a consequence the circuit voltage is substantially constant, and the open circuit voltage of the apparatus may be at a relatively low and safe value.

A fifth distinction, which includes some of the distinctions previously mentioned, is that the tubular arc 31 in Fig. 1 is relatively stable. Arc stability is affected by variations in the length of the arc gap, variations in size of the increments of material transferred to the base metal, and by variations in the spacing or distribution of the metal particles along the arc stream. In Fig. 1 the dimension of the arc gap is constant, all of the particles in the metal stream 35 are on the same order in size, and the distribution of the metal particles in the stream 35 is substantially uniform.

A sixth distinction is that when the arc is used in an inert gas the usual expedients for boosting the welding voltage are not required. Inert gas usually acts to increase resistance along the arc to an excessive extent but not when the new electrode is used.

A seventh distinction is that whereas the conventional welding process represented by Figs. 4 and 5 cannot be applied to the welding of stainless steel in an oxygen-free or inert atmosphere, the welding procedure represented by Fig. 1 can be employed for welding stainless steel with facility and with superior results.

*Explanation of the new welding process*

I cannot state with assurance that the factors accounting for the new mode of welding have been identified and evaluated, and therefore I do not bind myself by any explanation or theory advanced herein. It is believed, however, that some discussion of the factors that are possibly involved or appear to be involved will be helpful in understanding the invention and in distinguishing the invention from prior art practices.

It is evident that there is some differentiation in kind or degree between the rimmed portion 26 and the core portion 27 of the electrode 25. More than one differentiation may be involved.

Some differentiation between the rimmed portion and the core portion of the new electrode exists in the electrode stock prior to the cold working to produce the finished electrode. Usually the selected hot rolled rod is formed from an ingot in which the segregates are more or less concentrated in the central core portion of the ingot, even when the selected ingot is not rimmed, and since such segregates lower the conductivity of the metal mass the final electrode wire has greater conductivity in its outer or peripheral portion than in its core portion. A further fact to the same effect is that the core portion may be more porous than the peripheral portion, and usually is, the voids being of collapsed configuration. In the manufacture of low carbon steel electrodes the selection of markedly rimmed steel results in even greater differentiation with respect to conductivity between the peripheral portion and the core portion of the electrode wire. With reference to rimmed steel the separation or spacing of the rimmed portion 26 of the electrode 25 from the core portion 27 by the annular zone 30 of highly porous structure may be significant in permitting a "skin effect" on the inner circumferential surface of the rimmed portion 26. A further differentiation that may exist prior to the successive stages of cold working may be a somewhat greater density in the metal near the surface of the electrode wire caused by the previous hot rolling operations.

In any event whatever difference may be involved, adequate differentiation between the peripheral portion and the core portion does not exist in finished conventional electrode wire, and, in the present invention, does not exist in the initial hot rolled rod but does exist after the described cold working procedure. The extended cold working may create the only differentiation that accounts for the success of the new electrode, or may create a new differentiation the effect of which is added to the effect of differentiations already existing, or the cold working may merely augment one or more differentiations that already exist but must be increased to make the new welding method possible.

One factor affected by the cold working procedure that may well be of primary importance is simply the difference in density between the peripheral portion and the core portion of the electrode wire in the final product. The increase in density would, of course, increase the conductivity of the metal. It is well known that cold working a metal, for example copper, increases its conductivity.

Another factor affected by the cold working that may be of prime importance is the grain. There is reason to believe that the grain in the outer regions of the electrode wire is changed or refined by the successive cold working of the material.

There is substantial evidence that the extensive cold working of the electrode wire causes some change of state of the metal and thereby conditions the metal for a certain reversion or reconversion during the final welding operation. Apparently this phenomenon is in the nature of internal stresses created by the cold working, which stresses are relieved with useful results when the electrode is heated by the arc. The internal stresses may be intermolecular, or, conceivably, may occur in the molecules.

The nature of the reversion or reconversion of the metal in response to the rise in temperature adjacent the arc may be purely mechanical. That is to say, the action may be that of stretched or deformed substance contracting or otherwise returning to its normal form. Such mechanical action may in itself account for the avoidance of cyclic globule formation. This thought has some logic since the formation of large drops of molten metal is made possible only by relatively strong continuous surface tension, and the continual readjustment of the electrode metal in response to rising temperature occurs in a relatively shallow longitudinal zone in the solid electrode metal adjacent the melted metal on the end of the electrode. If the physical disturbance is sufficient to weaken the surface tension of the material, such readjustment in the adjacent solid metal may in itself serve to prevent the cyclic formation of globules.

There is some reason to believe that the cold working of the metal produces an actual change in phase in the metal, at least near the periphery of the electrode, and that a reconversion to the original phase occurs when the metal is heated to the critical temperature, the critical temperature being reached only in the tip portion of the electrode immediately adjacent the arc. Evidence of such transformation in phase is striking in the case of stainless steel, since the required cold working makes the normal non-magnetic stainless steel electrode wire magnetic and thus clearly indicates a change in phase from the normal austenite phase of stainless steel. It is well known that the individual grains in austenite steel are arranged in what is known as face-centered cubic lattice, whereas in the change in phase of martensite the structure changes to a body-centered cubic lattice.

The well known difference between the two structures is that in the face-centered lattice there is one atom at each corner of an imaginary cube and one atom in the center of each of the faces of the cube, so that each cube is composed of eight corner atoms and six face-centered atoms, making a total of fourteen atoms. In cubic-centered lattice there is one atom at each corner of the imaginary cube but only one additional atom in the center of the cube, the cube having a total of nine atoms.

When annealed unstressed austenite steel is stretched out by cold working to one-fourth, or less, of its original cross-sectional area, depending upon the analysis of the steel, the cubic face-centered lattice structure is stretched out and distorted longitudinally to such an extent as to form a cubic-centered lattice structure. As the arc reaches the stainless steel electrode that has been previously conditioned in this manner, the cubic-centered lattice structure is reconverted to the original face-centered cubic structure or austenite. The reconversion of the original austenite phase involves a distinct contraction in the volume of the metal, similar to the contraction in metal that could be caused by mere release of stress as heretofore mentioned, but in addition the reconversion in phase involves an absorption of heat as is well known in the metallurgical art. This absorption of heat, like the contraction in volume, occurs only immediately adjacent the arc where the metal finally reaches the critical transformation point.

The absorption of heat by the metal as it reaches the critical point for change in phase is important, because it tends to narrow the longitudinal zone of the electrode in which the metal is under transformation. There may also be a tendency for the narrow zone to stay close to the arc, since the arc is the ultimate source of the required heat. The tendency of the zone of transformation to be narrowed because of the absorption of heat involved in the change in phase may be understood by considering the temperature gradient longitudinally of the rod. If there were no heat absorption at the critical temperature the temperature readings at successive longitudinal stations progressing toward the arc would be represented by a smooth upwardly inclined curve. Because of the heat absorption at the critical temperature, however, there is a pause or offset in the curve, since the absorbed heat is taken not only from the arc but also from the cooler metal on the side of the transformation zone away from the arc.

The local absorption of heat may be beneficial in other respects that are not understood, and may have a desirable effect on the surface tension and on the rate at which the metal is melted.

It has been pointed out that relatively high surface tension in the molten metal at the end of the electrode is involved in the undesirable cyclic formation of large liquid globules, and that in the practice of the present invention this surface tension may be weakened by the local contraction of the metal adjacent the arc. A further factor, and perhaps the most important factor in the prevention of drop formation, is the tubular configuration of the heat pattern of the arc. The surface tension to support a large globule of liquid metal must be uniformly high over the surface of the globule, since a chain is no stronger than its weakest link. If the arc heat generated by a given current is of substantially uniform density, as in conventional practice, it may not have sufficient effect on the surface tension to prevent the formation of large liquid drops. On the other hand, if the same total available heat is concentrated in a ring around the base of the drop, as in the present arc, the chain of surface tension forces will be weakened in this circular zone below the tension force required to support a large drop. Thus the mere fact that the heat of the arc is not uniform across the surface of the melted metal on the electrode may account for the transfer of the metal from the arc in small particles instead of in large drops.

Other practices of the invention

With the above disclosed facts in mind those skilled in the art may employ other procedures, such as disclosed in the Pennington Patent No. 1,756,568, for producing an electrode suitable for carrying out the new method. By way of example, Fig. 6 shows a welding electrode 40 which is fabricated by encasing a core member 41 in a sheath 42 of extensively cold worked sheet metal. The core member 41 may be of any suitable metal. The sheath 42 may be in the form of a ribbon wound helically onto the core member, as indicated.

Fig. 7 shows an electrode 45 with a suitable metal core 46 that is encased in a sheet metal sheath 47. The sheath 47 is formed from an extensively cold worked sheet metal ribbon, the longitudinal edges 48 of which are brought together to form a tube. The fabrication process may consist of drawing the core 46 together with the sheet metal ribbon through suitable forming dies.

Fig. 8 shows in cross-section a wire core 50 inserted in a cold drawn tube 51. This fabricated rod may be passed through drawing dies for further reduction in size.

An electrode such as shown in Figs. 6, 7 and 8 is peculiarly suited to the welding of stainless steel, because there may be sufficient differentiation between the core and the casing to produce the tubular arc and at the same time an aggregate analysis desired in the finished weld. For example, the casing may be highly conductive cold worked mild steel and the core may be dead soft austenite, 25 chrome 12 nickel steel of poor conductivity to produce a tubular arc and to result in a final weld at least approximating 18–8 stainless steel.

The description of the selected practices of my invention in detail for the purpose of disclosure, and to illustrate the principles involved, will suggest to those skilled in the art various changes and substitutions under my basic concepts, and I reserve the right to all such departures from my description that lie within the scope of my appended claims.

I claim as my invention:

1. The method of producing welding rod including the steps of isolating the metal of the upper half of a rimmed steel ingot, hot rolling the metal to produce rod stock, and cold working the rod stock to reduce its cross-sectional area in successive gradual stages to not substantially more than 25% of its initial cross-sectional area while maintaining the temperature of the steel below the detrimental point with respect to the arc-influencing effect of the cold working.

2. A method of producing a welding rod characterized by the steps of cold working a rimmed steel rod to reduce its cross-sectional area in successive stages to not substantially more than one-fourth of its initial cross-sectional area, the reduction in each of said stages being not substantially more than 20%, and maintaining the temperature of the steel below the detrimental point with respect to the arc-influencing effect of the cold working.

3. A method of producing welding rod characterized by the cold working of a rimmed steel rod for the reduction of the rod in cross-sectional area in successive stages, the reduction in each of said stages being not substantially more than 15%, the total reduction in cross-sectional area being of the order of about 75% and sufficient to cause the formation of a tubular welding arc, and maintaining the temperature of the steel below the detrimental point with respect to the arc-influencing effect of the cold working.

4. A method of producing a low carbon steel welding rod characterized by cold working a low carbon steel rod having a rim portion of thirty-five to sixty percent of its total cross-sectional area to reduce the rod in successive, gradual stages to a cross-sectional area not substantially more than one-fourth of the initial cross-sectional area of said rod, and maintaining the temperature of the steel below the detrimental point with respect to the arc-influencing effect of the cold working.

5. As a new article of manufacture, a welding electrode of rimmed steel reduced in cross-sectional area by cold working in stages, the reduction in each stage being not substantially greater than 20%, and the final cross-sectional area being not substantially more than 25% of the initial cross-sectional area, the steel being maintained below a temperature detrimental with respect to the arc-influencing effect of the cold working.

6. As a new article of manufacture, a welding electrode of normally non-magnetic, low carbon, austenitic rimmed steel reduced in cross-sectional area at least about 75% by cold working in successive, gradual stages without detrimental rise in temperature to convert at least a surface portion thereof to a ferromagnetic state capable of being attracted by a magnet.

7. As a new article of manufacture, a welding electrode of rimmed steel reduced in cross-sectional area by cold working in successive, gradual stages at a temperature below that detrimental to the arc-influencing effect of the cold working, and having a peripheral portion of relatively high conductivity and an integral core portion of less conductivity with sufficient conductivity differential between the two portions to produce a welding arc having a generally tubular pattern of heat concentration as distinguished from a heat pattern substantially uniform in cross-section.

8. As a new article of manufacture, a low carbon electrode of rimmed steel reduced in cross-sectional area by cold working in stages without detrimental rise in temperature, the reduction in each stage being not substantially greater than 20%, and the final cross-sectional area being not substantially more than 25% of the initial cross-sectional area, and the cross-sectional area of the rim portion of said electrode being of the order of thirty-five to sixty percent of the total cross-sectional area.

9. A new article of manufacture, a rimmed alloy steel electrode reduced in cross-sectional area by cold working in stages without detrimental rise in temperature, the reduction in each stage being not substantially greater than 15%, and the final cross-sectional area being not substantially more than 25% of the initial cross-sectional area.

10. As a new article of manufacture, an electrode for arc-welding comprising a metal core surrounded by a fabricated sheath of sheet metal, the sheet metal being cold worked to an extent to produce an arc of the same character as the arc produced by a rimmed steel electrode of solid metal cold worked in gradual stages to reduce its cross-sectional area by about 75% without detrimental rise in temperature.

11. As a new article of manufacture, an electrode for welding steel comprising a soft austenitic core of higher chrome and nickel content than 18-8 stainless steel surrounded by a cold worked mild steel casing, the difference in conductivity between the core and casing being sufficient to produce a tubular arc.

ARTHUR A. BERNARD.

REFERENCES CITED

The following references are of record in the file of this patent:

UNITED STATES PATENTS

| Number | Name | Date |
| --- | --- | --- |
| 446,497 | Williams | Feb. 17, 1891 |
| 773,012 | Horton | Oct. 25, 1904 |
| 1,265,453 | Jones | May 7, 1918 |
| 1,356,468 | Peters et al. | Oct. 19, 1920 |
| 1,358,311 | Harris | Nov. 9, 1920 |
| 1,441,686 | Jones | Jan. 9, 1923 |
| 1,756,568 | Pennington | Apr. 29, 1930 |
| 1,794,983 | Ritter | Mar. 3, 1931 |
| 1,814,878 | Weed | July 14, 1931 |
| 1,880,545 | Waldman | Oct. 4, 1932 |
| 1,936,799 | Mathias | Nov. 28, 1933 |
| 1,999,888 | Ammann | Apr. 30, 1935 |
| 2,021,945 | Payne | Nov. 26, 1935 |
| 2,137,471 | Zublin | Nov. 22, 1938 |
| 2,149,436 | Hadenfeldt | Mar. 7, 1939 |
| 2,301,320 | Phillips et al. | Nov. 10, 1942 |
| 2,369,730 | Fisk | Feb. 20, 1945 |

OTHER REFERENCES

"The Making, Shaping and Treating of Steels" by J. M. Camp and C. B. Francis, published by the Carnegie-Illinois Steel Corporation, Pittsburgh, Pennsylvania, fifth edition, page 609 to 611 and 1005.

"The Book of Stainless Steels," by Thum, 1935, 2nd edition, pages 118, 119, 372, 373.